United States Patent [19]

Banka et al.

[11] 4,053,736
[45] Oct. 11, 1977

[54] DIGITAL RATE COMPENSATOR FOR A CARD READER

[75] Inventors: Eugene F. Banka; Gerald J. Lehner, both of Livonia, Mich.

[73] Assignee: Burroughs Corporation, Detroit, Mich.

[21] Appl. No.: 672,999

[22] Filed: Apr. 2, 1976

[51] Int. Cl.² ............... G06K 7/08; G06K 7/10; G11B 25/04; G11B 5/09
[52] U.S. Cl. ............... 235/61.11 D; 235/61.11 E; 250/569; 340/146.3 Z; 360/2; 360/51
[58] Field of Search ............... 235/61.11 D, 61.11 E; 250/555, 566, 568, 569; 360/2, 25, 26, 40, 48, 51; 340/146, 32, 146.3 K; 329/106, 104, 126

[56] References Cited
U.S. PATENT DOCUMENTS

| | | | |
|---|---|---|---|
| 3,708,655 | 1/1973 | Schanne | 235/61.11 E |
| 3,882,301 | 5/1975 | Nossimbene | 235/61.11 D |
| 3,932,731 | 1/1976 | Moore, Jr. | 235/61.11 D |
| 3,949,313 | 4/1976 | Tamada et al. | 329/106 |
| 3,949,394 | 4/1976 | Kennedy | 235/61.11 D |

*Primary Examiner*—Daryl W. Cook
*Attorney, Agent, or Firm*—David R. Syrowik; Ronald L. Taylor; Carl Fissell, Jr.

[57] ABSTRACT

A digital rate compensator for accommodating a wide dynamic range of data speeds derived from a encoded card reader thereby allowing downstream logic to compensatably follow said derived data. The digital rate compensator additionally includes a start message check for conclusive determinations of beginning of card reads.

21 Claims, 10 Drawing Figures

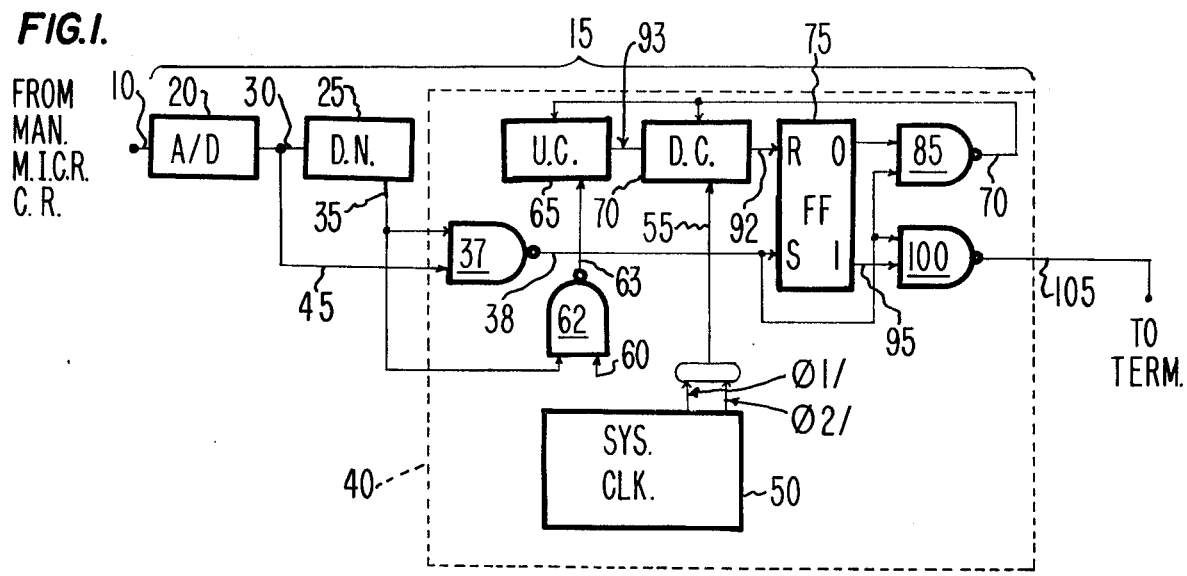
FIG.1.
FIG.3.
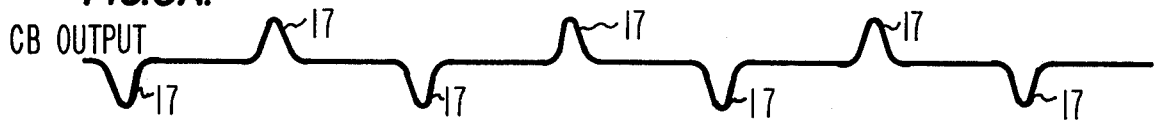
FIG.3A.
FIG.3B.
FIG.3C.
FIG.3D.
FIG.3E.
FIG.3F.
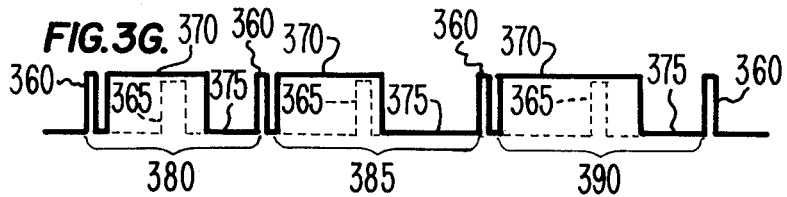
FIG.3G.

DIGITAL RATE COMPENSATOR FOR A CARD READER

CROSS REFERENCE TO A RELATED PATENT APPLICATION

A patent application entitled "Credit Card Reader Amplifier" bearing application Ser. No. 601,667 and filed on Aug. 4, 1975 by Eugene F. Banka and Roger F. Thompson and assigned to Burroughs Corporation describes and claims a card reader speed compensation system upon which the present invention is an improvement.

BACKGROUND OF THE INVENTION

1. Field of the Invention

This invention relates to the field of encoded card speed compensating devices and more particularly to digital compensation apparatuses able to operate over a wide dynamic input range.

2. Prior Art

Previously, apparatuses used for speed compensation for a manual encoded card reader were usually inertia restraining devices. Because of the mechanical nature of such devices, definite limitations in regards to reliability and dynamic input range were inherent therein. Evolutionary improvements in speed compensation apparatuses have taken the form of quasi-analog or semi-linear electronic devices using discrete components such as RC networks as the timing units for controlling speed compensation in the apparatus.

Another related problem involves the determination of the true beginning of the message that is encoded on the card being read. Specifically, nosiy transients may be read as data due to improper encoding or physical damage on the card if there is an inconclusive beginning of encoded information on the card.

SUMMARY OF THE INVENTION

It is an important object of the invention to employ a digital speed compensation device having a period that will adjust in or out over a wide dynamic range of data speeds for an encoded card being read.

It is another object of the invention to provide first and second digital counters clocked at first and second rates, and reset by clock pulses read from the encoded card for computing a window that is a temporal subset of the encoded card clock period for allowing passage of encoded card data during said window.

Another further object of the invention is to provide a unit for enabling a true begin of read of the encoded card thereby disallowing transients from being read in as data during a given period.

In carrying out the objects of the invention, a signal from an encoded card reader is inputted to an analog-to-digital converter which outputs amplified digital pulses corresponding to the peaks of the inputted signal. The digitized pulses are then fed to a begin read determining device for ascertaining a true start of message. Next, those digitized pulses recognized as clock components by a data window flip-flop will be used to reset an up-counter thus enabling it to be incremented by a relatively slow clock. Recognition of the clock component will also subsequently enable the contents of the up-counter to be transferred to a down-counter with a relatively fast clock which will proceed to decrement to zero. The adjustable period of the down-counter is a predetermined proportion of the measured period of the up-counter, thus enabling the down-counter period to act as a window for incoming data. All time thereafter the current window and until the subsequent window will be a temporal zone wherein all pulses derived from the encoded card will be recognized as clock signals for reinitiating the supra process thus allowing a wide dynamic range of pulses from the encoded card to be correctly recognized as data.

BRIEF DESCRIPTION OF THE DRAWINGS

Various other objects, advantages and meritorious features of the invention will become more fully apparent from the following specification, appended claims and accompanying drawing sheets.

The features of a specific embodiment of the invention are illustrated in the drawings, in which:

FIG. 1 is a block diagram of the digital rate compensator for a card reader;

FIGS. 3A through 3G are timing diagrams of the digital rate compensator for a card reader.

DESCRIPTION OF THE PREFERRED EMBODIMENT

Figure 2:
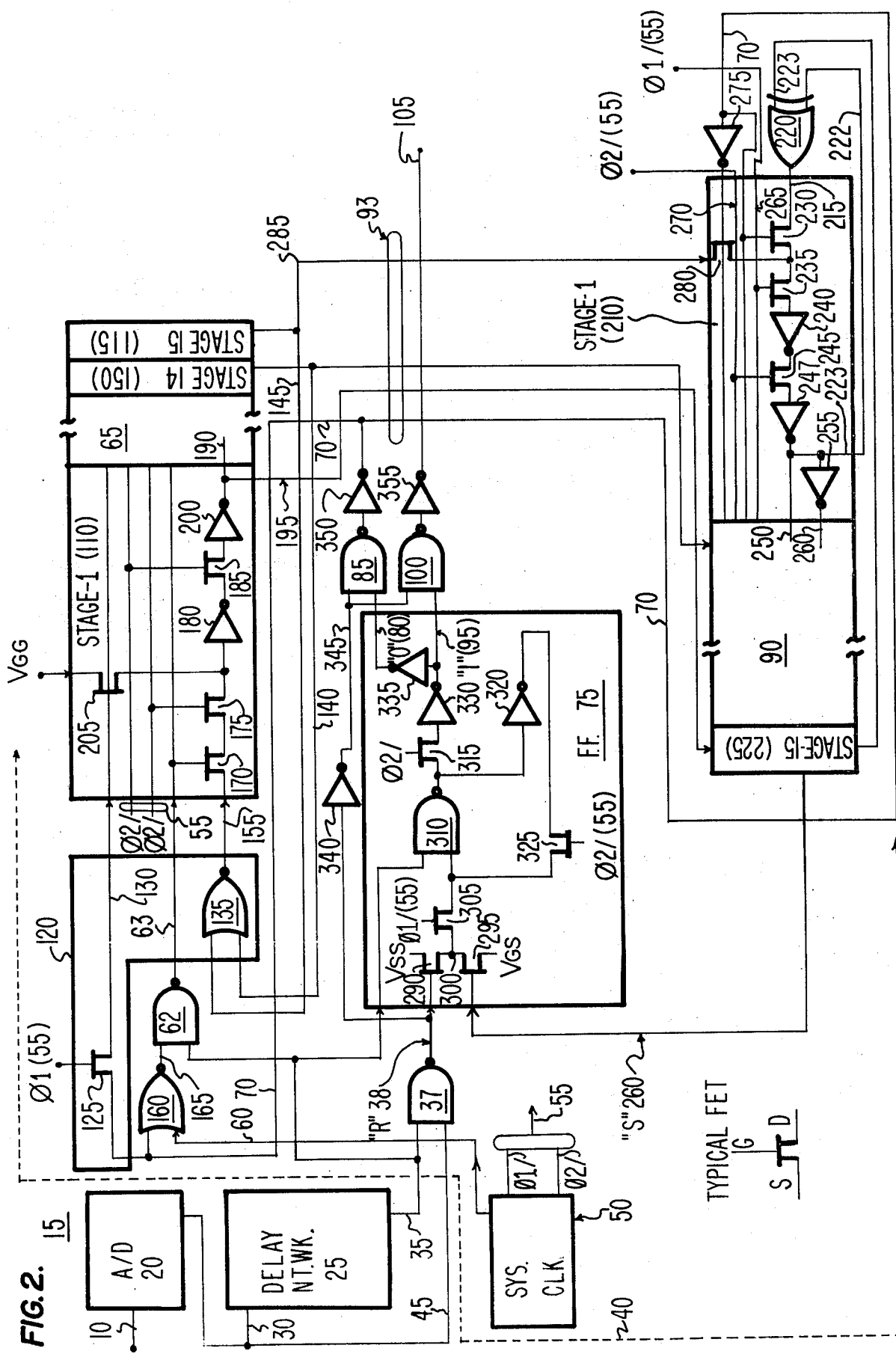
FIG. 2 is a schematic diagram of the digital rate compensator for card reader.

Referring to FIGS. 1 through 3 by the characters of reference there is illustrated an apparatus using MOS FET for carrying out the objects of the invention.

With reference to FIGS. 1 and 3A, signals 17 which shows clock components but may be operative to have data components also as received on line 10 from a manual magnetic stripe encoded card reader (not shown) by the compensator system 15 and in particular an analog-to-digital converter 20. The converter 20 being similar to that used in the supra cited cross-referenced patent application by Banka and Thompson. The converter 20 functions to receive the analog-like card reader signals 17 and peak sense them so as to create positive polarity narrow digital pulses temporally aligned with the positive and negative peaks of the original analog signal 17.

A delay network 25 similar to that used in the supra cited cross-referenced patent application by Banka and Thompson acts to receive signals 27 on line 30 as shown in FIG. 3B from the converter 20. The purpose of the network 25 being to output a disenabling pulse in line 35 at the beginning of read to a NAND gate 37 to prevent the rate compensator 40 itself from transferring the first plurality pulses emitted by the converter 20 on line 45 through to line 38 to the rate compensator 40 of the compensator system 15. The plurality of supra pulses being the first eight in this embodiment. The network 25 itself is a four stage up-counter. By such disenabling of the rate compensator 40 for a given first plurality of pulses, jitter or noise transients, that may be especially prevalent at the beginning of a card read due to quality control or use problems, may be prevented from being mistakely entered into the rate compensator 40 as legitimate pulses.

The rate compensator 40 itself includes a system clock 50 having a clock generator consisting of a ring oscillator (not shown) whose nominal frequency signal 52 is 600 KHZ as shown in FIG. 3C and a phase splitter (not shown) receiving its input from the 600 KHZ clock generator. The two non-overlapping negative phase output signals "01/" and "02/" of the phase splitter are each one-half the frequency of the 600 KHZ clock generator or 300 KHZ each. The parallel outputs of 01/ and 02/ signals from the system clock 50 as shown in FIGS. 3D and 3E respectively are collectively indicated by a single line 55 in FIG. 1. The system clock 50 additionally includes a two-thirds control of frequency divider (not shown) that will act to receive each of the 300 KHZ signals of 01/ and 02/ of the system clock 50 and convert it to two-thirds of the original frequency as shown in FIG. 3F or 300 KHZ to 200 KHZ which is outputted as a signal 57 on line 60. The system clock 50 including the phase splitter and the frequency divider are all well known in the art.

The rate compensator 40 as shown in FIG. 2, specifically includes a 15 bit up-counter 65 of the pseudo-random shift register type which may be reset derivatively through lines 38 then 70 by a clock component of the signal from the card reader (not shown). Once enabled, the up-counter 65 will count the 200 KHZ outputted on line 63 from the system clock 50. Where the previous signal from the card reader was a data component, the next signal will be interpreted to be a clock component which will act to set a flip-flop 75 to logic state "1". Before the flip-flop 75 switches to logic state "1" and while it is still momentarily in the logic state "0" as outputted on line 80, a NAND gate 85 will, upon concurrent receipt of signals on lines 38 and 80 output a signal on line 70. This signal on line 70 may be assumed to be a clock component of the signal from the card reader which will act to reset the up-counter 65 as mentioned supra and additionally activate a down-counter 90 to receive in parallel fashion the contents of the up-counter 65 on collective lines 93. The down-counter 90 being a 15 bit pseudo-random shift register. The up-counter 65, upon being reset, will again immediately begin incrementally counting up. The down-counter 90 is operative to count the 300 KHZ signals of 01/ and 02/ on line 55 from the system clock 50. Because of the frequency differential of 300 KHZ versus 200 KHZ for the down-counter 90 versus the up-counter 65 respectively, the down-counter 90 will be able decrementally count down to zero in two-thirds of the time required for the up-counter 65 to count up. Since the up-counter 65 will count up during the entire interval between the clock components of the signal received from the card reader, the down-counter 90 will be able to reach zero and reset the flip-flop 75 to its logic state "0" through line 92 when the interval between the clock components is two-thirds completed. When the flip-flop 75 is in its "1" state, it will output on line 95. When a NAND gate 100 concurrently receives signals on lines 95 and 45, it will output on line 105 a signal that is the output from the system 15 to the terminal (not shown) and may be assumed to contain only data components of the signal from the card reader. The interval during which the flip-flop 75 is set to state "1" is analogous to a temporal windown in which it may be assumed that one data component (either bit "1" or "0") will appear and not a clock component from the card reader over a wide dynamic range of data rates.

As described supra, the rate compensator 40 has an up-counter 65 that is a 15 bit pseudo-random shift register. The reset pulse for the up-counter 65 is obtained derivatively through lines 38 through 70 as a clock component of the signal from the card reader. Once reset, the up-counter 65 will be operative to count the 200 KHZ pulses outputted on line 63 from the system clock 50. The up-counter 65 has identical stages 1 (110) through 15 (115) corresponding to bit 1 through bit 15 positions of a shift register.

Proceeding stage 1 (110) of the up-counter 65 is a conditioning circuit 120 comprising a FET 125 having a source (S) terminal which is coupled to the infra mentioned clock component line 70, a gate (G) terminal coupled to the 01/ parallel output of line 55, and a drain (d) terminal coupled on line 130 to the up-counter 65 input. Pulses on lines 70 and 130 will act to transfer the contents of the up-counter 65 to the down-counter 90 as will be described infra, then reset the up-counter 65. Also in the conditioning circuit 120 is an exclusive OR gate 135 receiving inputs on line 140 and 145 from the high outputs of stage 14 (150) and stage 15 (115) respectively of the up-counter 65. The purpose of the exclusive OR 135 being to feedback a signal on line 155 to an input of the up-counter 65 whenever there is a bit in either, but not both of said stages. Such feedback as on lines 140 and 145 being used to allow the up-counter 65 to track the count sequence at the high end to thereby control possible overflow as is well known in the art for pseudo-random shift registers. Adjacent to the conditioning circuit 120 is the supra mentioned NAND gate 62 which additionally includes a NOR gate 160 outputting on line 165 to NAND gate 62. The gate 160 is operative to receive inputs from line 60 as mentioned before, and also from clock component line 70 thereby enabling the clock component to be counted as bit 1 in the up-counter 65. It will be noted that the up-counter 65 also receives parallel outputs 01/ and 02/ on line 55 for use as alternating synchronizing pulses in each stage of the up-counter 65 as is well known in the art.

In the up-counter 65 itself and in particular identical stage-1 (110), a feedback line 155 mentioned supra is coupled to the source (S) terminal of a FET 170 used for count cognizance as described infra. The drain (D) terminal of the FET 170 is coupled in turn to a FET 175 used for 01/ pulse synchronization as described infra. Likewise, the drain (D) of the FET 170 is connected to the input of an inverter 180. The output of inverter 180 is operatively linked to the source (S) terminal of a FET 185 used for 02/ pulse synchronization as described infra. The drain (D) terminal of the FET 185 will proceed in turn through an inverter 200 as the feedback line 190 for the next stage and also bifurcate as the transfer line 195 to stage-15 of the down-counter 90. The purpose of the transfer line 195 being to enable the down-counter 90 to receive the contents of the up-counter 65 whenever a clock component is received by the down-counter 90 on line 70 as detailed infra.

Count pulses on line 63 derived from the clock component on line 70 or the 200 KHZ clock on line 60 act to drive the gate (G) of FET 170 for purposes of closing the line between the source and drain of said FET 170 thereby incrementing the up-counter 65. The line 63 is operative to continue successively through the remaining stages of the up-counter 65 to perform the same function. The parallel outputs of 01/ and 02/ on line 55 act to gate FET's 175 and 185 respectively and likewise on successive stages to synchronize the counted pulses from the 200 KHZ clock on line 60 to the clock component on line 70 which serves as the count benchmark. As indicated supra, the up-counter 65 is reset by clock component pulses on line 130 as derived from line 70 to thereby gate a FET 205. The source (S) terminal of FET 205 is operatively interposed between the drain (D) of FET 175 and the input of inverter 180 which when gated will be grounded out through the drain (D) of FET 205 to $V_{GG}$ thereby resetting each successive stage in a like manner.

The down-counter 90 as mentioned supra is a pseudo-random 15 bit shift register of a type well known in the art. In the first identical stage 210 of the down-counter 90, there is a feedback line 215 analoguous in function to that described supra in regards to the up counter 65 which is outputted by an exclusive OR gate 220. The exclusive OR gate is operative to receive inputs on lines 222 or 223 either from the first or last stage 225 respectively of the down-counter 90 for count cognizance as detailed infra. The feedback line 215 is fed to the source (S) terminal of a FET 230 whose (D) terminal is fed in turn to the source (S) terminal of a FET 235. The drain (D) of the FET 235 is coupled to an inverter 247 and then trifurcatably inputted on line 250 to the next stage of the down-counter 90, an inverter 255, and the feedback line 222 respectively. The inverter 255 outputs to a line 260 that is common to all stages of the down-counter 90 and which represents the low output of each stage. As such, when all stages of the down-counter 90 are low, a signal representative of such will be outputted from the last stage 225 on the line 260 to be sent to the "R" input of the flip-flop 75.

The parallel outputs 01/ and 02/ on the line 55 are inputted to the down-counter 90 on lines 265 and 270 respectively for purposes of decrementing the down-counter 90 to zero as indicated supra. Specifically, 01/and 02/ on lines 265 and 270 will act to gate FET 230 and FET 245 respectively. Clock components on line 70 acting through inverter 275 to gate an FET 280 will allow the contents of the up-counter 65 on line 285 to be transferred to the down-counter 90 as indicated supra. As such, when a signal is applied to the gate (G) of the FET 280, the source (S) will be coupled to the drain (D) thereby allowing the transferrence for that stage 210 and analoguously for successive stages in inverted order. During said supra transferrence, as a precautionary measure to disenable counting, a signal on line 70 will disallow gating the FET 230 thus discoupling the source and drain of the FET 230 during such an interval. In addition, to facilitate a non-polarity change in regards to NAND gates 85 and 100, inverter 350 and 355 may be coupled to the respective outputs thereof.

The bistable flip-flop 75 mentioned supra is comprised of a FET 290 whose gate (G) receives the card read signal from line 38 to thereby couple the Vss potential source (S) terminal to the drain (D) terminal of the same FET 290. Likewise, a FET 295 is operative when its gate (G) terminal receives signals from the down-counter 90 on line 260 to couple its source (S) and Vgg potential drain (D) terminals. The source (S) and drain (D) terminals of FET's 290 and 295 respectively are tied together at point 300 to be inputted in turn to the source (S) terminal of FET 305. When the 01/ parallel output of line 55 acting on a synchronizing pulse is applied to the drain (D) terminal of FET 305 to be in turn applied to the input of NAND gate 310. The NAND gate 310 also must concurrently receive a signal from the delay network 25 on line 35 indicating that the given plurality of beginning signals has been processed as detailed supra.

Thus, upon concurrent receipt on NAND gate 310, a signal will be bifurcatably outputted to the source (S) terminal of a FET 315 and to the input of an inverter 320. The inverter 320 will in turn output to the source (S) terminal of a FET 325. When the 02/ parallel output of line 55 acting as a synchronizing pulse is applied to the gate (G) terminal of the FET 325, the source (S) terminal will be coupled to the drain (D) terminal of FET 325. The drain (D) terminal of FET 325 is, in turn, interposably coupled between the drain (D) terminal of FET 305 and the NAND gate 310 described supra. The drain (D) terminal of FET 315 outputs to an inverter 330 which, in turn, bifurcatably outputs to the supra described line 95 and to an inverter 335. The inverter 335 outputs to the supra described line 80. Interposed between the NAND gate 37 on line 38 and the common inputs to NAND gates 85 and 100 is an inverter 340 outputting on line 345 to the common inputted NAND gates 85 and 100.

In the operation of the system, as an example, if it is assumed that the encoded card is manually transported through the card reader at a gradually increasingly slower speed, the data rates outputted from the card reader on line 10 will accordingly also be proportionately slower. As such, the clock component of the card reader signal, as viewed at 360 in FIG. 3G as representative of line 70, will also be increasingly drawn out. Thus, the data component 365, as shown in FIG. 3G, in absolute terms appear to be increasingly spatially removed from the clock component 360 at the beginning of each succeeding interval. Accordingly, the data window 370, as shown in FIG. 3G, will also have to be increasingly lengthened to compensatably encompass the moved out data component 360. Likewise, the non-data interval 375 will be absolutely shortened until the data window 370 is spatially a predetermined two-third proportional subset of the overall temporal interval 380 between clock component 360. If the system 15 proceeds from a temporal interval 380 that is adjusted that is, a two-thirds data window 370, then if a non-adjusted temporal interval 385 follows, it follows that the digitized compensator 40 will be able to recover to be adjusted in the temporal interval 390 immediately subsequent to the non-adjusted temporal interval 385.

From the foregoing description of a specific mechanism illustrating the fundamental features of the invention, it will now be apparent to those skilled in the art that the invention may be constructed in a variety of forms without departing from the true spirit and scope thereof. Accordingly, it is to be understood that the illustrated mechanism disclosed herein is a preferred embodiment of the invention and that the invention is not to be limited thereby, but only by the appended claims.

What is claimed is:

1. An apparatus enabled to receive clock and data components from a card reader having variable output data rates for determining a data passage window that will adjust in or out to compensate for a relatively uneven data rate, comprising:

clock means for generating a first and a second digital pulse at a relatively low frequency and high frequency response level respectively;

first counter means operative to be reset by a clock component from the card reader for incrementing upon receipt of the first digital pulse from said clock means for measurement of the current temporal interval between clock signals from the card reader;

second counter means for receiving the transferred contents of said first counter means upon receipt of a clock component from the card reader, and for being decremented by each received second digital pulse from said clock means for measuring the current data passage window that is a predetermined proportional subset of the temporal interval as calculated between the preceeding set of clock signals from the card reader; and flip-flop means operative to be enabled to its set state by a clock component from the card reader after said second counter means has zero decremented for indicating the allowable beginning of the data passage window, and further being operative for enabling to its reset state upon receipt of a zero decrementation signal from the second counter means for indicating the predetermined end of the data passage window, wherein said flip-flop means further includes gating means operative upon concurrent receipt of inputs of signals from the card reader and the reset state of said flip-flop means for outputting to said first and second counter means, a signal indicative that the received signal from the card reader was a clock component.

2. The apparatus for determining a data passage window of claim 1 wherein said gating means is a NAND gate.

3. An apparatus enabled to receive clock and data components from a card reader having variable output data rates for determining a data passage window that will adjust in or out to compensate for a relatively uneven data rate, comprising:

clock means for generating a first and a second digital pulse at a relatively low frequency and high frequency response level respectively;

first counter means operative to be reset by a clock component from the card reader for incrementing upon receipt of the first digital pulse from said clock means for measurement of the current temporal interval between clock signals from the card reader;

second counter means for receiving the transferred contents of said first counter means upon receipt of a clock component from the card reader, and for being decremented by each received second digital pulse from said clock means for measuring the current data passage window that is a predetermined proportional subset of the temporal interval as calculated between the preceeding set of clock signals from the card reader; and flip-flop means operative to be enabled to its set state by a clock component from the card reader after said second counter means has zero decremented for indicating the allowable beginning of the data passage window, and further being operative for enabling to its reset state upon receipt of a zero decrementation signal from the second counter means for indicating the predetermined end of the data passage window, wherein said flip-flop means further includes gating means operative upon concurrent receipt of inputs of signals from the card reader and the set state of said flip-flop means for outputting, as the data rate compensated output of the apparatus, a signal indicative that the received signal from the card reader was a data component.

4. The apparatus for determining a data passage window of claim 3 wherein said gating means is a NAND gate.

5. An apparatus enabled to receive clock and data components from a card reader having variable output data rates for determining a data passage window that will adjust in or out to compensate for a relatively uneven data rate, comprising:

clock means for generating a first and a second digital pulse at a relatively low frequency and high frequency response level respectively;

first counter means operative to be reset by a clock component from the card reader for incrementing upon receipt of the first digital pulse from said clock means for measurement of the current temporal interval between clock signals from the card reader;

second counter means for receiving the transferred contents of said first counter means upon receipt of a clock component from the card reader, and for being decremented by each received second digital pulse from said clock means for measuring the current data passage window that is a predetermined proportional subset of the temporal interval as calculated between the preceeding set of clock signals from the card reader;

converter means operatively interposed between the card reader and the input to the apparatus for generating digitized signals representative of the card reader signal; and delay network means operative to receive the card reader signal from said converter means for in turn issuing a predetermined time delayed enabling signal.

6. The apparatus for determining a data passage window of claim 5 wherein said delay network means is a four stage up counter.

7. The apparatus for determining a data passage window of claim 5 wherein said delay network further comprises gating means operative upon concurrent receipt of inputs of the digitized signal from said converter means and the time delayed enabling signal from said delay network means for allowing the signal from the card reader to be inputted to the apparatus after the predetermined time delay of said delay network means.

8. The apparatus for determining a data passage window of claim 10 wherein said gating means is a NAND gate.

9. The apparatus for determining a data passage window of claim 5 further comprising gating means operative upon concurrent receipt of the first digital pulses from said clock means and the time delayed enabling signals from said delay network means for inhibiting outputting of the first digital pulses from said clock means to said first counter means until expiration of the predetermined time delay of said delay network means.

10. The apparatus for determining a data passage window of claim 9 wherein said gating means is a NAND gate.

11. A digital system operative to receive clock and data signals from a manual magnetic stripe encoded card reader for determining a data window for data signal passage that will act to compensate for a non-constant signal rate before inputting to an associated terminal, comprising:

system clock means for generating first and second triggering pulses at a relatively low frequency and high frequency mode respectively;

up-counter means reset by a first clock signal from the card reader for incrementally counting the first triggering pulses from said system clock means until again reset by a subsequent clock signal from the card reader for defining a temporal interval;

bistable means operative to receive a clock signal from the card reader for enabling said bistable means to be in the set state, and for indicating the start of a data window that is a predetermined subset of the temporal interval which will allow only data signals from the card reader to pass through to the terminal; and down-counter means enabled upon the setting of the state of said bistable means to be initialized by the contents of said up-counter means for decremention to zero by the seccond triggering pulse from said system clock means, and operative to output a zero decremention signal for enabling said bistable means to be in the reset state to indicate the predetermined end of the data window within the temporal interval, wherein said bistable means further includes gating means operative upon concurrent receipt of inputs of signals from the card reader and the reset state of said bistable means for outputting to said up counter means and said down counter means a signal indicative that the received signal from the card reader was a clock signal.

12. The digital system for compensating for a non-constant data rate of claim 11 wherein said gating means is a NAND gate.

13. A digital system operative to receive clock and data signals from a manual magnetic stripe encoded card reader for determining a data window for data signal passage that will act to compensate for a non-constant signal rate before inputting to an associated terminal, comprising:

system clock means for generating first and second triggering pulses at a relatively low frequency and high frequency mode respectively;

up-counter means reset by a first clock signal from the card reader for incrementally counting the first triggering pulses from said system clock means until again reset by a subsequent clock signal from the card reader for defining a temporal interval;

bistable means operative to receive a clock signal from the card reader for enabling said bistable means to be in the set state, and for indicating the start of a data window that is a predetermined subset of the temporal interval which will allow only data signals from the card reader to pass through to the terminal; and down-counter means enabled upon the setting of the state of said bistable means to be initialized by the contents of said up-counter means for decremention to zero by the second triggering pulse from said system clock means, and operative to output a zero decremention signal for enabling said bistable means to be in the reset state to indicate the predetermined end of the data window within the temporal interval, wherein said bistable means further includes gating means operative upon concurrent receipt of inputs of signals from the card reader and the set state of said bistable means for outputting, as the output to the terminal, a signal indicative that the received signal from the card reader was a data signal.

14. The digital system for compensating for a non-constant data rate of claim 13 wherein said gating means is a NAND gate.

15. A digital system operative to receive clock and data signals from a manual magnetic stripe encoded card reader for determining a data window for data signal passage that will act to compensate for a non-constant signal rate before inputting to an associated terminal, comprising:

system clock means for generating first and second triggering pulses at a relatively low frequency and high frequency mode respectively;

up-counter means reset by a first clock signal from the card reader for incrementally counting the first triggering pulses from said system clock means until again reset by a subsequent clock signal from the card reader for defining a temporal interval;

bistable means operative to receive a clock signal from the card reader for enabling said bistable means to be in the set state, and for indicating the start of a data window that is a predetermined subset of the temporal interval which will allow only data signals from the card reader to pass through to the terminal;

down-counter means enabled upon the setting of the state of said bistable means to be initialized by the contents of said up-counter means for decremention to zero by the second triggering pulse from said system clock means, and operative to output a zero decremention signal for enabling said bistable means to be in the reset state to indicate the predetermined end of the data window within the temporal interval; and converter means operatively interposed between the card reader and the input to the digital system for generating digitized signals representative of the card reader signal having analog polarity peaks.

16. The digital system for compensating for a non-constant data rate of claim 15 further comprising delay network means operative to receive the card reader signal from said converter means for in turn issuing a predetermined time delayed enabling signal.

17. The digital system for compensating for a non-constant data rate of claim 16 wherein said delay network means is a four stage up-counter.

18. The digital system for compensating for a non-constant data rate of claim 16 wherein said delay network further comprises gating means operative upon concurrent receipt of inputs of the digitized signal from said converter means and the time delayed enabling signal from said delay network means for allowing the signal from the card reader to be inputted to the digital system after the predetermined time delay of said network means.

19. The digital system for compensating for a non-constant data rate of claim 18 wherein said gating means is an NAND gate.

20. The digital system for compensating for a non-constant data rate of claim 16 further comprising gating means operative upon concurrent receipt of the first triggering pulses from said system clock means and the time delayed enabling signals from said delay network means for inhibiting outputting of the first triggering pulses from said system clock means to said up counter means until the predetermined time delay of said delay network means has elapsed.

21. The digital system for compensating for a non-constant data rate of claim 20 wherein said gating means is a NAND gate.

* * * * *